United States Patent
Chay (10) Patent No.: US 12,414,003 B2
(45) Date of Patent: Sep. 9, 2025

(54) TRANSMISSION RATE ADAPTATION WITH BURST PROBING

(71) Applicant: Intel Corporation, Santa Clara, CA (US)

(72) Inventor: Dor Chay, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1051 days.

(21) Appl. No.: 17/132,514

(22) Filed: Dec. 23, 2020

(65) Prior Publication Data

US 2022/0201535 A1 Jun. 23, 2022

(51) Int. Cl.
*H04W 28/02* (2009.01)
*H04W 52/24* (2009.01)
*H04W 74/0816* (2024.01)
*H04W 84/12* (2009.01)

(52) U.S. Cl.
CPC ..... *H04W 28/0252* (2013.01); *H04W 52/241* (2013.01); *H04W 74/0816* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,986,676 B2 * | 7/2011 | Waxman | H04W 28/22 370/231 |
| 2007/0002892 A1 * | 1/2007 | Waxman | H04B 7/061 370/465 |
| 2015/0181458 A1 * | 6/2015 | Aryafar | H04L 1/0026 370/230 |
| 2016/0381706 A1 * | 12/2016 | Huang | H04W 74/0808 370/329 |

FOREIGN PATENT DOCUMENTS

WO 2009145585 A2 12/2009

OTHER PUBLICATIONS

May 19, 2022 (EP) Search Report—Application 21213497.7.

* cited by examiner

*Primary Examiner* — Peter Chen
(74) *Attorney, Agent, or Firm* — Banner & Witcoff Ltd.

(57) ABSTRACT

A wireless station, including a transceiver configured to transmit and receive wireless signals; and a processor configured to control the transceiver to transmit, in a single transmission opportunity, a burst sequence of Physical Layer Convergence Procedure (PLCP) Protocol Data Units (PPDUs) having different transmission rates, based on wireless link condition information, until a transmission rate adaption sequence converges to one of the different transmission rates having a highest throughput.

23 Claims, 3 Drawing Sheets

FIG 1

100
Wireless Communication System

Access Point (AP)

Client Station (STA1)

Client Station (STA2)

Client Station (STA3)

FIG 4

400
Wireless Comm. Method

410
Transmitting, in a single transmission opportunity, a burst sequence of Physical Layer Convergence Procedure (PLCP) Protocol Data Units (PPDUs) having different transmission rates, based on wireless link condition information, until a transmission rate adaption sequence converges to one of the different transmission rates having a highest throughput.

420
In a remainder of the transmission opportunity, data at the highest throughput, and at decreasing transmission powers until an increase in PER.

FIG 5

500
Wireless Station (e.g., access point AP or client station STA)

530 Transceiver

540 Antenna(s)

520 Memory
525 Software

510 Processor

300
Partial MCS Table

TRANSMISSION RATE ADAPTATION WITH BURST PROBING

TECHNICAL FIELD

This disclosure relates in general to the field of wireless signal transmission, and more particularly, to wireless signal transmission rate adaptation using burst probing.

BACKGROUND 802.11 transmission rate adaptation in accordance with the IEEE 802.11 protocol is typically based on trial-and-error, physical measurements, or both. The trial-and-error approach involves a wireless station transmitting physical layer protocol data units (PPDUs) using physical layer configuration it is probing for (e.g. bandwidth, modulation and coding scheme (MCS), transmit power, etc.), and receiving an acknowledgment from a peer wireless station, with each PPDU being sent in a separate transmit opportunity (TxOP). The physical layer measurement approach requires measuring physical signal characteristics (e.g., received signal strength indicator (RSSI) or signal-to-noise ratio (SNR)), and based on these measurements, converging to the optimal physical layer transmission rate.

802.11 medium access control (MAC) layer in the IEEE 802.11 protocol is not time managed (e.g., time division multiple access (TDMA)), but is instead contention-based in which more than one wireless station contends for a transmission medium. Each transmit opportunity has built in overhead for transmission medium contention (e.g., request-to-send/clear-to-send (RTS/CTS) handshake). Additionally, after each PPDU, other wireless stations may contend for the transmission medium. The time required for transmission rate adaptation algorithms to converge to the optimal transmission rate thus increases with increasing network congestion.

DESCRIPTION OF THE ASPECTS

By way of overview, this disclosure is directed to performing transmission rate adaptation by probing transmission rates in burst, that is, by including a plurality of probing physical layer protocol data units (PPDUs) in a single transmission opportunity. Each PPDU is transmitted with a different probing rate, until the transmission rate adaptation converges to the optimal transmission rate. The remainder of the transmission opportunity can then be used to transmit data at the optimal transmission rate.

Figure 1:
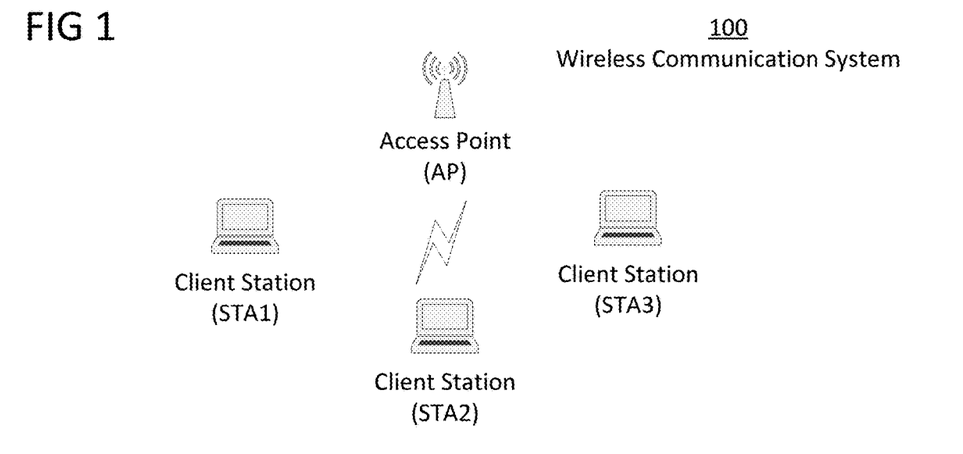
FIG. 1 is a diagram illustrating an example wireless communication system in accordance with aspects of the disclosure.

FIG. 1 is a diagram illustrating an example wireless communication system 100 of a dynamic transmission bandwidth selection in accordance with aspects of the disclosure.

The wireless communication system 100 may be a Wireless Local Access Network (WLAN), and more specifically, a WLAN that operates in accordance with a version of the IEEE 802.11 protocol, though the disclosure is not limited in this regard. The example wireless communication system 100 includes a plurality of client stations STA (STA1, STA2, STA3) associated with an access point AP, which is in turn connected to another network (not shown). A client station STA may transmit/receive its packets with a peer client station STA either via the access point AP, or directly.

The aspects disclosed herein are applicable to wireless stations, which include, for example, access points (APs) and their associated client stations (STAB) (e.g., workstations, computers, laptops, printers, smart phones, etc.). For ease of explanation, the disclosure will often refer to each of these wireless stations generically as a station. It is understood that unless stated otherwise, any description of aspects of an access point, client station, wireless station, or simply a station is applicable to either type of wireless station. It is also contemplated that the concepts disclosed herein may be applicable to other wireless stations not specifically mentioned. The explicit disclosure of access points and client stations is for ease of explanation and not meant to be limiting.

Figure 2:
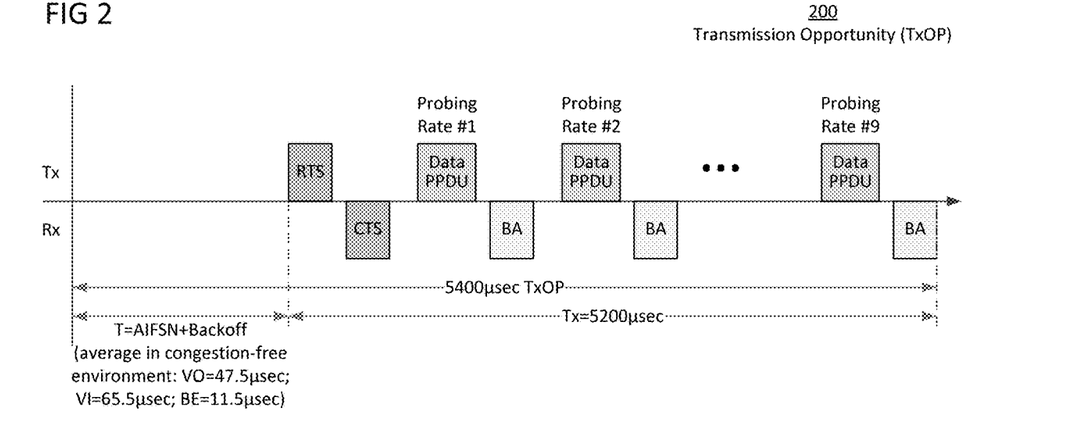
FIG. 2 is a block diagram illustrating a transmit opportunity in accordance with aspects of the disclosure.

FIG. 2 is a block diagram illustrating a transmit opportunity (TxOP) 200 in accordance with aspects of the disclosure.

A transmit opportunity defines a time duration for which a wireless station can send transmission frames after it has gained contention for the transmission medium. In the example shown, the transmit opportunity has a duration of 5400 μsec. Each transmission opportunity begins with an interframe spacing period that may include an arbitration inter-frame spacing number (AIFSN), a backoff, etc. AIFSN is a value that indicates a prioritization of an access category, such as giving voice or video priority over file transfer or web browsing. The AIFSN shortens or expands the period the wireless station has to wait before it is allowed to transmit its next transmission frame. And backoff is a random amount of time a wireless station with a transmission frame to send has to wait before it wins contention of the transmission medium. The more congested the wireless environment, the longer the wireless station may have to wait to win contention to transmit during a transmission opportunity. In this example the AIFSN, backoff, and any other defined spacing is approximately 200 μsec.

In order to reduce collisions between transmission frames from different wireless stations, a request-to-send/clear-to-send (RTS/CTS) mechanism is used. The mechanism starts when a transmitter wireless station (Tx) wants to transmit a frame to a receiver wireless station (Rx). Tx begins by sending an RTS frame to the Rx to request permission to send the transmission frame. If the Rx receives this request, the Rx answers with a CTS frame to indicate that the transmission channel is clear to send. Upon receipt of the CTS, Tx sends a first data PPDU with a first probing rate and starts an acknowledgement (ACK) timer. Upon correct receipt of the first data PPDU, Rx responds with a first acknowledgement (e.g., block acknowledgement (BA)). Upon receipt of the first BA, the Tx determines based on received wireless link condition information, which PPDU to transmit next. The Tx then sends a second data PPDU with a second probing rate. Upon correct receipt of the second data PPDU, the Rx responds with a second BA. The Tx again determines based on updated received wireless link condition information, which probing rate to transmit in the next PPDU. This sequence continues until the transmission rate adaption sequence converges to a transmission rate having a highest throughput. If the Tx ACK timer expires before the TX receive the ACK, the transmission is treated as a failure (e.g., collision), and after a backoff, the CTS/RTS mechanism is repeated.

The transmit opportunity 200 has a burst of data PPDUs in a single transmit opportunity (i.e., nine PPDUs in this example). The burst of PPDUs enables the transmission rate convergence algorithm to converge to the transmission rate having the highest throughput much faster. This is because each iteration of the transmission rate convergence is within the same transmission opportunity, not separate transmission opportunities each having its own overhead (i.e., AIFSN, backoff, RTS/CTS, etc.). The wireless station does not have to repeatedly wait for other wireless stations to finish their transmissions and then again contend for the transmission channel. Instead the wireless station transmits its probing data PPDUs in a burst in a single transmission opportunity. The transmission rate convergence may thus occur following only a single interframe spacing and a single RTS/CTS period.

Size and duration of each PPDU in this probing sequence is subject to a link adaptation decision. For low latency use cases, where convergence should be done as fast as possible, Quality of Service (QoS) null PPDUs may be included in the transmit opportunity in order to converge to the optimal transmission rate more quickly.

After the transmission rate convergence, the Tx can transmit, in a remainder of the transmission opportunity, a burst sequence of PPDUs at varying transmission powers. The transmission powers may change until an increase in PER.

Transmission rate adaptation adjusts between multiple transmission rates based on the current transmission link conditions. If too many transmission frames are lost, a strategy to increase successful transmissions is for the transmitting wireless station to lower the transmission rate. Slower rates use more robust modulations that are more likely to be received correctly for a given signal-to-noise ratio. And conversely, if transmission frames are delivered with little loss, a wireless station can occasionally test a higher transmission rate.

The transmission rates may be defined by a combination of bandwidth, modulation and coding scheme (MCS), number of spatial streams (Nss), guard interval (GI), and transmission power. These are merely example transmission rate factors. The disclosure is not necessarily limited in this regard.

The transmission rate adaptation algorithm maintains PER statistics for previously-sampled transmission rates. The algorithm selects the optimal transmission rate according to high throughput and latency. Throughput (TpT) is may be determined as follows:

$$TpT=(1-\text{average\_PER})*(\text{physical layer transmission rate}) \quad \text{(Equation 1)}$$

To factor in latency, the transmission rate is selected according to the highest expected throughput within a PER limit, for example, up to 5%.

The transmission rate adaptation algorithm initially converges to a particular transmission rate. Then in order to adapt to changes in the transmission link, the rate adaptation algorithm probes for a transmission rate that provides better throughput. This is accomplished by the transmission rate adaption sequence dynamically changing MCS, Nss, bandwidth, GI, and transmission power until the transmission rate convergences. Whether the transmission rate adaptation algorithm increases or decreases the transmission rate is based on PER.

If the PER is low, the transmission rate adaptation algorithm probes for a higher physical transmission rate. This is referred to as "rate upscaling." The convergence here is slower because the PER is already low, and a higher transmission rate at this point is speculative. A faster convergence, however, is still preferable. The transmission rate adaptation algorithm chooses probing candidates for rate upscaling and performs trial and error before deciding whether to converge to a new transmission rate. The transmission rate adaption sequence in this case may comprise increasing the MCS, increasing the Nss, increasing the bandwidth, and then decreasing the GI and the transmission power until the transmission rate convergence.

If the PER is high, the transmission rate adaptation algorithm probes for a more robust transmission rate. This usually means a lower physical transmission rate because there is a trade-off between rate and robustness. This is referred to as "rate downscaling." The convergence in this case should be fast in order to sustain the transmission link and guarantee decent latency and jitter. The transmission rate adaptation algorithm chooses transmission rate probing candidates for rate downscaling and will perform trial and error in order to converge to a new transmission rate. The transmission rate adaption algorithm in this case may comprise decreasing the MCS, decreasing the Nss, decreasing the bandwidth, and then increasing the GI and the transmission power until transmission rate convergence.

If the PER is unknown, which can be at connection establishment or after an idle period, the transmission rate adaptation algorithm decides on an anchor transmission rate and probing candidates. The algorithm then upscales/downscales based on the PER and trial-and-error. This transmission rate adaptation is performed quickly in order to achieve high throughput.

In all three cases (i.e., PER high, PER low, PER unknown), fast convergence to the highest throughput is required, or at least preferred.

Figure 3:
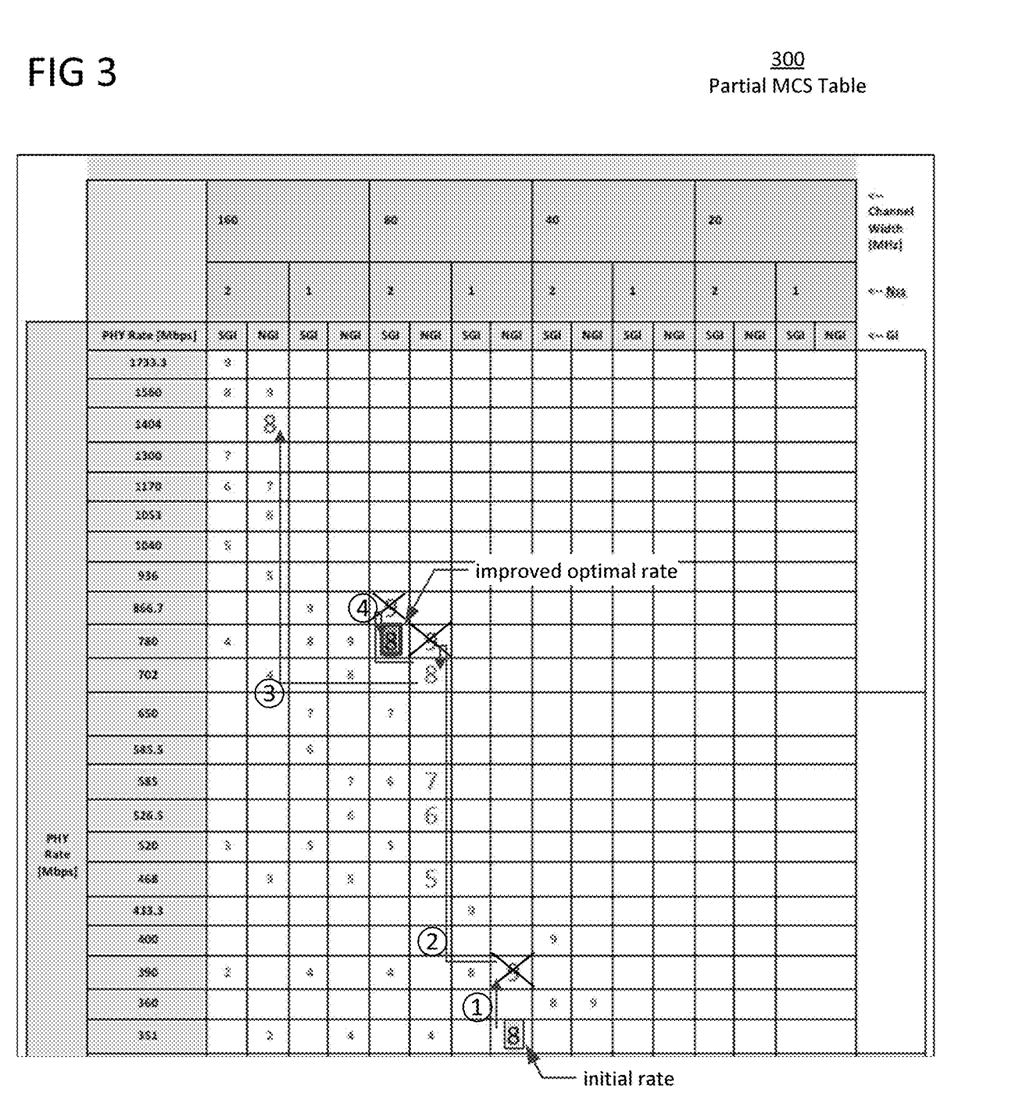
FIG. 3 is an example of a partial Modulation and Coding Scheme (MCS) table in accordance with aspects of the disclosure.

FIG. 3 is an example of a partial modulation and coding scheme (MCS) table 300 in accordance with aspects of the disclosure. The MCS table 300 lists to the IEEE 802.11ac (VHT) rates, but this is an example only.

This MCS table is used as an example for the transmission rate adaptation algorithm in which the PER is consistently low. In a trial-and-error based approach it is not known in advanced how much improvement is possible, if at all. The algorithm performs rate upscaling to test for better throughput and latency.

More specifically, table 300 includes very high throughput (VHT) orthogonal frequency division multiplexing (OFDM) rates of the IEEE 802.11ac protocol, with a 160 MHz 2×2 connection, where the numbers in the table denote the MCS, and each row corresponds to a different physical layer rate. As can be seen, several different transmission rates may have the same physical layer rate. This table 300 demonstrates the probing candidates from each physical transmission rate, and the direction for upscaling and downscaling (along the diagonal between the bottom-right corner to the upper-left corner).

By way of example, assume that the initial transmission rate is r={BW=80 MHz, Nss=1, NGI, MCS=8} with a physical layer rate of 351 Mbps. And in addition, assume that the link conditions enable an optimal transmission rate improvement up to r={BW=80 MHz, Nss=2, SGI, MCS=8} with physical layer rate of 780 Mbps. The rate adaptation algorithm determines the optimal rate by trial-and-error. More specifically, mapping the probing candidates may proceed in the following order:

As indicated in the figure by ①, the transmission rate adaptation algorithm increases the MCS from MSC8 in the same column. Above MSC8, there is only MCS9. The rate adaptation algorithm probes at MCS9, and the transmission fails, that is, the transmission yields a PER which reduces the selected criterion.

Next, as indicated in the figure by ②, the transmission rate adaptation algorithm increases Nss by changing columns from Nss=1 to Nss=2, and converges to the best MCS there. In this example the next best transmission rate in the new column is MCS5. Transmission rate probing is performed for the best MCS in this column, and the algorithm converges to MCS8, but after a transmission at MCS9 fails.

Next, as indicated by ③, the transmission rate adaptation algorithm increases the bandwidth by changing columns from 80 MHz to 160 MHz, and then converges to the best MCS in the new column. The algorithm probes MCS8 and fails. There is no MCS index in this column for convergence.

Then, as indicated by ④, the transmission rate adaptation algorithm improves guard interval (GI) by changing columns from NGI (0.8 usec) to SGI (0.4 usec), and then converges to the best MCS there. The algorithm, probes MCS8 and succeeds, then probes MCS9 and fails.

After the transmission rate adaptation algorithm probes nine different rates, the algorithm finally converges to r={BW=80 MHz, Nss=2, SGI, MCS=8} with a physical layer rate of 780 Mbps.

The transmission rate adaptation algorithm in this example improves the convergence time by probing in burst. Assume a client station STA and an access point AP are contenting for the transmission medium, working symmetrically and dividing the transmission medium equally, each using a 5400 usec transmission opportunity at a time with access category (AC) is best effort, and bursting is allowed by the AP's enhanced distributed channel access (EDCA) policy. Also, being realistic and assuming each probing trial is shorter than the usual full transmit opportunity of 5400 usec, instead using short aggregation of 10 MPDUs, and for simplicity, assume each probing trial takes 500 usec of data regardless of the probing rate.

Without the transmission rate adaptation algorithm with burst probing as disclosed herein, the time between each start of probing trial is 6170 usec. This is based on 110 usec for interframe spacing (i.e., AIFSN and backoff), 100 usec for contention (i.e., RTS+CTS+2*short interframe space (SIFS)), 500 usec for probing data PPDU, 60 usec for BA+SIFS, and 5400 usec for the other client stations' transmit opportunities. For nine probing rates, the overall convergence time is approximately 55 msec (i.e., 9*6670 usec=55 msec).

On the other hand, with the transmission rate adaptation algorithm with burst probing as disclosed herein, the time between each start of probing trial in a burst is only 576 usec. This is based on 500 usec for probing data PPDU, and 76 usec for (SIFS+BA+SIFS). For nine probing rates, the overall convergence time is 5.2 msec (i.e., 9*76 usec=5200 usec). Unlike when burst probing is not used, there is no extra interframe spacing, contention, and other client stations' transmit opportunities for multiple transmission opportunities. And since the overall convergence time is less than the transmit opportunity time of 5400 usec, the entire probing sequence can be performed in a single transmit opportunity.

This example demonstrates how much faster the algorithm with burst probing converges to the optimal transmission rate, thus improving overall throughput. This improvement is further realized as the network congestion increases and the wireless environment becomes more dynamic. Congested networks can have significantly more than the one access point AP with a 5.4 msec transmit opportunity. And a dynamic wireless environment causes PER fluctuations and triggers more probing from the transmission rate adaptation algorithm.

Figure 4:
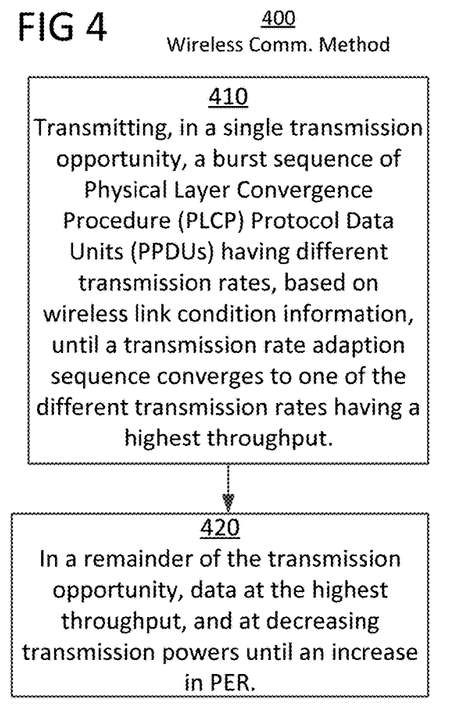
FIG. 4 is a flowchart illustrating a wireless communication method in accordance with aspects of the disclosure.

FIG. 4 is a flowchart illustrating a wireless communication method 400 in accordance with aspects of the disclosure.

At block 410, a burst sequence of Physical Layer Convergence Procedure (PLCP) Protocol Data Units (PPDUs) having different transmission rates, is transmitted, in a single transmission opportunity, based on wireless link condition information, until a transmission rate adaption sequence converges to one of the different transmission rates having a highest throughput.

At block 420, transmitting, in a remainder of the transmission opportunity, data at the highest throughput, and at decreasing transmission powers until an increase in PER.

Figure 5:
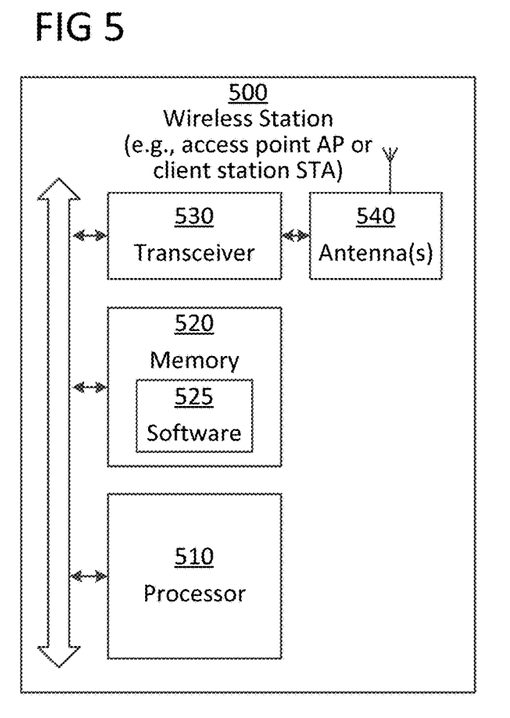
FIG. 5 is a block diagram illustrating an example wireless station configured to filter out unwanted frames carried on a received wireless signal in accordance with various aspects of the disclosure.

FIG. 5 is a block diagram illustrating an example wireless station 500 configured to adapt to the optimal transmission rate by probing transmission rates in burst in accordance with aspects of the disclosure. The wireless station 500 may be an access point AP or a client station STA.

The wireless station 500 may include processor 510, memory 520, transceiver 530, and antenna(s) 540. Each of these components may communicate, directly or indirectly, with one another (e.g., via one or more buses).

The memory 520 may include random access memory (RAM) and/or read only memory (ROM). The memory 1010 may store computer-readable, computer-executable software 525 including instructions that, when executed, cause the processor 510 to perform various functions described herein. In some cases, the software 525 may not be directly executable by the processor 510, but may cause a computer (e.g., when compiled and executed) to perform functions described herein. The processor 510 may include an intelligent hardware station, (e.g., a central processing unit (CPU), a microcontroller, an application specific integrated circuit (ASIC), etc.)

The transceiver 530 may communicate bi-directionally, via one or more antennas, wired, or wireless links, with one or more networks, as described above. For example, the transceiver 530 may communicate bi-directionally with an access point AP or a wireless station STA. The transceiver 530 may also include a modem to modulate the packets and provide the modulated packets to the antenna(s) 540 for transmission, and to demodulate packets received from the antenna(s) 540. In some cases, the wireless station 500 may include a single antenna 540. However, in some cases the wireless station may have more than one antenna 540, which may be capable of concurrently transmitting or receiving multiple wireless transmissions.

The processor 510 of this disclosure is configured to control the transceiver 530 to transmit, in a single transmission opportunity, a burst sequence of PPDUs having different transmission rates, based on wireless link condition information, until a transmission rate adaption sequence converges to one of the different transmission rates having the highest throughput. After the transmission rate convergence, the processor 510 is further configured to control the transceiver 530 to transmit, in a remainder of the transmission opportunity, data at the highest throughput.

The processor 510 may be a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The aspects of this disclosure are application to any Wireless Local Area Network (WLAN) communication protocol that uses a listen-before talk-type mechanism, such as Clear Channel Assessment (CCA). One example is the IEEE 802.11 protocol, though the disclosure is not limited in this respect.

The burst probing rate adaptation disclosed herein results in improved throughput, latency and jitter in all environments, but particularly in congested and dynamic environments. Dynamic environments have a higher need to probe for the optimal rate, and the closer the probing is to the actual transmission time the better. This burst probing rate adaptation scheme achieves both without congesting the network.

The techniques of this disclosure may also be described in the following examples.

Example 1. A wireless station, comprising: a transceiver configured to transmit and receive wireless signals; and a processor configured to control the transceiver to transmit, in a single transmission opportunity, a burst sequence of Physical Layer Convergence Procedure (PLCP) Protocol Data Units (PPDUs) having different transmission rates, based on wireless link condition information, until a transmission rate adaption sequence converges to one of the different transmission rates having a highest throughput.

Example 2. The wireless station of example 1, wherein after the transmission rate convergence, the processor is further configured to control the transceiver to transmit, in a remainder of the transmission opportunity, data at the highest throughput.

Example 3. The wireless station of example 1, wherein after the transmission rate convergence, the processor is further configured to control the transceiver to transmit, in a remainder of the transmission opportunity, a burst sequence of PLCP PPDUs at decreasing transmission powers until an increase in packet error rate (PER).

Example 4. The wireless station of example 1, wherein the processor is configured to receive, after each successful PPDU transmission, a corresponding acknowledgment from another wireless station.

Example 5. The wireless station of example 1, wherein the processor is configured to receive, after each PPDU transmission, wireless link condition information, based upon which the processor determines which PPDU to control the transceiver to transmit next.

Example 6. The wireless station of example 1, wherein the processor is further configured to control the transceiver to transmit in the transmission opportunity at least one null PPDU.

Example 7. The wireless station of example 1, wherein the transmission rate convergence to the one transmission rate having the highest throughput occurs following a single request-to-send/clear-to-send (RTS/CTS).

Example 8. The wireless station of example 1, wherein at least one of the PPDUs is free of arbitration inter-frame spacing (AIFS).

Example 9. The wireless station of example 1, wherein at least one of the PPDUs is free of a backoff period.

Example 10. The wireless station of example 1, wherein the wireless station is an access point.

Example 11. The wireless station of example 1, wherein the wireless station is a wireless station.

Example 12. The wireless station of example 1, wherein the wireless station is configured to operate in a wireless local access network (WLAN).

Example 13. The wireless station of example 1, wherein the wireless station is configured to operate in accordance with the IEEE 802.11 protocol.

Example 14. The wireless station of example 1, wherein the transmission rates are defined by a combination of bandwidth, Modulation and Coding Scheme (MCS), number of spatial streams (Nss), guard interval (GI), and transmission power.

Example 15. The wireless station of example 1, wherein the transmission rate adaption sequence comprises dynamically changing modulation and coding scheme (MCS), number of spatial streams (Nss), bandwidth, guard interval (GI), and transmission power until the transmission rate and transmission power convergence.

Example 16. The wireless station of example 15, wherein the transmission rate adaption sequence comprises increasing the MCS, increasing the Nss, increasing the bandwidth, and then decreasing the GI and the transmission power until the transmission rate convergence.

Example 17. The wireless station of example 15, wherein the transmission rate adaption sequence comprises decreasing the MCS, decreasing the Nss, decreasing the bandwidth, and then increasing the GI and the transmission power until the transmission rate convergence.

Example 18. A wireless communication method, comprising: transmitting, by a transceiver, in a single transmission opportunity, a burst sequence of Physical Layer Convergence Procedure (PLCP) Protocol Data Units (PPDUs) having different transmission rates, based on wireless link condition information, until a transmission rate adaption sequence converges to one of the different transmission rates having a highest throughput.

Example 19. The wireless communication method of example 18, further comprising: after the transmission rate convergence, transmitting, in a remainder of the transmission opportunity, data at the highest throughput.

Example 20. The wireless communication method of example 18, further comprising: after the transmission rate convergence, transmitting, in a remainder of the transmission opportunity, a burst sequence of PLCP PPDUs at decreasing transmission powers until an increase in packet error rate (PER).

Example 21. The wireless communication method of example 18, further comprising: receiving, after each successful PPDU transmission, a corresponding acknowledgment from another wireless station.

Example 22. The wireless communication method of example 18, further comprising: receiving, after each PPDU transmission, wireless link condition information; and determining, based upon the wireless link condition information, which PPDU to control the transceiver to transmit next.

Example 23. The wireless communication method of example 18, wherein the transmission rate convergence to the one transmission rate having the highest throughput occurs following a single request-to-send/clear-to-send (RTS/CTS).

Example 24. The wireless communication method of example 18, wherein at least one of the PPDUs is free of arbitration inter-frame spacing (AIFS) and a backoff period.

Example 25. The wireless communication method of example 18, wherein the transmission rate adaption sequence comprises dynamically changing modulation and coding scheme (MCS), number of spatial streams (Nss), bandwidth, guard interval (GI), and transmission power until the transmission rate and transmission power convergence.

Example 26. A wireless station, comprising: a transceiving means for transmitting and receive wireless signals; and a processing means for controlling the transceiving means to transmit, in a single transmission opportunity, a burst sequence of Physical Layer Convergence Procedure (PLCP) Protocol Data Units (PPDUs) having different transmission rates, based on wireless link condition information, until a transmission rate adaption sequence converges to one of the different transmission rates having a highest throughput.

Example 27. The wireless station of example 26, wherein after the transmission rate convergence, the processing means is further for controlling the transceiving means to transmit, in a remainder of the transmission opportunity, data at the highest throughput.

Example 28. The wireless station of any of examples 26-27, wherein after the transmission rate convergence, the processing means is further controlling the transceiving means to transmit, in a remainder of the transmission opportunity, a burst sequence of PLCP PPDUs at decreasing transmission powers until an increase in packet error rate (PER).

Example 29. The wireless station of any of examples 26-28, wherein the processing means is further for receiving, after each successful PPDU transmission, a corresponding acknowledgment from another wireless station.

Example 30. The wireless station of any of examples 26-29, wherein the processing means is further for receiving, after each PPDU transmission, wireless link condition information, based upon which the processing means determines which PPDU to control the transceiving means to transmit next.

Example 31. The wireless station of any of examples 26-30, wherein the processing means is further for controlling the transceiving means to transmit in the transmission opportunity at least one null PPDU.

Example 32. The wireless station of any of examples 26-31, wherein the transmission rate convergence to the one transmission rate having the highest throughput occurs following a single request-to-send/clear-to-send (RTS/CTS).

Example 33. The wireless station of any of examples 26-32, wherein at least one of the PPDUs is free of arbitration inter-frame spacing (AIFS).

Example 34. The wireless station of any of examples 26-33, wherein at least one of the PPDUs is free of a backoff period.

Example 35. The wireless station of any of examples 26-34, wherein the wireless station is an access point.

Example 36. The wireless station of any of examples 26-35, wherein the wireless station is a wireless station.

Example 37. The wireless station of any of examples 26-36, wherein the wireless station is configured to operate in a wireless local access network (WLAN).

Example 38. The wireless station of any of examples 26-37, wherein the wireless station is configured to operate in accordance with the IEEE 802.11 protocol.

Example 39. The wireless station of any of examples 26-38, wherein the transmission rates are defined by a combination of bandwidth, Modulation and Coding Scheme (MCS), number of spatial streams (Nss), guard interval (GI), and transmission power.

Example 40. The wireless station of any of examples 26-39, wherein the transmission rate adaption sequence comprises dynamically changing modulation and coding scheme (MCS), number of spatial streams (Nss), bandwidth, guard interval (GI), and transmission power until the transmission rate and transmission power convergence.

Example 41. The wireless station of any of examples 26-40, wherein the transmission rate adaption sequence comprises increasing the MCS, increasing the Nss, increasing the bandwidth, and then decreasing the GI and the transmission power until the transmission rate convergence.

Example 42. The wireless station of any of examples 26-41, wherein the transmission rate adaption sequence comprises decreasing the MCS, decreasing the Nss, decreasing the bandwidth, and then increasing the GI and the transmission power until the transmission rate convergence.

Example 43. A wireless communication method, comprising: transmitting, by a transceiving means, in a single transmission opportunity, a burst sequence of Physical Layer Convergence Procedure (PLCP) Protocol Data Units (PPDUs) having different transmission rates, based on wireless link condition information, until a transmission rate adaption sequence converges to one of the different transmission rates having a highest throughput.

Example 44. The wireless communication method of example 43, further comprising: after the transmission rate convergence, transmitting, in a remainder of the transmission opportunity, data at the highest throughput.

Example 55. The wireless communication method of any of examples 43-44, further comprising: after the transmission rate convergence, transmitting, in a remainder of the transmission opportunity, a burst sequence of PLCP PPDUs at decreasing transmission powers until an increase in packet error rate (PER).

Example 46. The wireless communication method of any of examples 43-45, further comprising: receiving, after each successful PPDU transmission, a corresponding acknowledgment from another wireless station.

Example 47. The wireless communication method of any of examples 43-46, further comprising: receiving, after each PPDU transmission, wireless link condition information; and determining, based upon the wireless link condition information, which PPDU to control the transceiving means to transmit next.

Example 48. The wireless communication method of any of examples 43-47, wherein the transmission rate convergence to the one transmission rate having the highest throughput occurs following a single request-to-send/clear-to-send (RTS/CTS).

Example 49. The wireless communication method of any of examples 43-48, wherein at least one of the PPDUs is free of arbitration inter-frame spacing (AIFS) and a backoff period.

Example 50. The wireless communication method of any of examples 43-49, wherein the transmission rate adaption sequence comprises dynamically changing modulation and coding scheme (MCS), number of spatial streams (Nss), bandwidth, guard interval (GI), and transmission power until the transmission rate and transmission power convergence.

While the foregoing has been described in conjunction with example aspects, it is understood that the term "example" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A wireless station, comprising:
a transceiver configured to transmit and receive wireless signals; and
a processor configured to control the transceiver to transmit, in a single transmission opportunity, a burst sequence of Physical Layer Convergence Procedure (PLCP) Protocol Data Units (PPDUs) having different transmission rates, based on wireless link condition information, until a transmission rate adaption sequence converges to one of the different transmission rates having a highest throughput,
wherein after the transmission rate adaption convergence, the processor is further configured to control the transceiver to transmit, in a remainder of the single transmission opportunity, a remaining portion of the burst sequence of PLCP PPDUs in the single transmission opportunity at decreasing transmission powers until an increase in packet error rate (PER).

2. The wireless station of claim 1, wherein after the transmission rate adaption convergence, the processor is further configured to control the transceiver to transmit, in the remainder of the single transmission opportunity, data at the highest throughput.

3. The wireless station of claim 1, wherein the processor is configured to receive, after each successful PPDU transmission, a corresponding acknowledgment from another wireless station.

4. The wireless station of claim 1, wherein the processor is configured to receive, after each PPDU transmission, wireless link condition information, based upon which the processor determines which PPDU to control the transceiver to transmit next.

5. The wireless station of claim 1, wherein the processor is further configured to control the transceiver to transmit in the single transmission opportunity at least one null PPDU.

6. The wireless station of claim 1, wherein the transmission rate adaption convergence to the one transmission rate having the highest throughput occurs following a single request-to-send/clear-to-send (RTS/CTS).

7. The wireless station of claim 1, wherein at least one of the PPDUs is free of arbitration inter-frame spacing (AIFS).

8. The wireless station of claim 1, wherein at least one of the PPDUs is free of a backoff period.

9. The wireless station of claim 1, wherein the wireless station is an access point.

10. The wireless station of claim 1, wherein the wireless station is a wireless station.

11. The wireless station of claim 1, wherein the wireless station is configured to operate in a wireless local access network (WLAN).

12. The wireless station of claim 1, wherein the wireless station is configured to operate in accordance with the IEEE 802.11 protocol.

13. The wireless station of claim 1, wherein the transmission rates are defined by a combination of bandwidth, Modulation and Coding Scheme (MCS), number of spatial streams (Nss), guard interval (GI), and transmission power.

14. The wireless station of claim 1, wherein the transmission rate adaption sequence comprises dynamically changing modulation and coding scheme (MCS), number of spatial streams (Nss), bandwidth, guard interval (GI), and transmission power until the transmission rate and transmission power convergence.

15. The wireless station of claim 14, wherein the transmission rate adaption sequence comprises increasing the MCS, increasing the Nss, increasing the bandwidth, and then decreasing the GI and the transmission power until the transmission rate adaption convergence.

16. The wireless station of claim 14, wherein the transmission rate adaption sequence comprises decreasing the MCS, decreasing the Nss, decreasing the bandwidth, and then increasing the GI and the transmission power until the transmission rate adaption convergence.

17. A wireless communication method, comprising:
transmitting, by a transceiver, in a single transmission opportunity, a burst sequence of Physical Layer Convergence Procedure (PLCP) Protocol Data Units (PPDUs) having different transmission rates, based on wireless link condition information, until a transmission rate adaption sequence converges to one of the different transmission rates having a highest throughput; and
after the transmission rate adaption convergence, transmitting, in a remainder of the single transmission opportunity, a remaining portion of the burst sequence of PLCP PPDUs in the single transmission opportunity at decreasing transmission powers until an increase in packet error rate (PER).

18. The wireless communication method of claim 17, further comprising:
after the transmission rate adaption convergence, transmitting, in a remainder of the single transmission opportunity, data at the highest throughput.

19. The wireless communication method of claim 17, further comprising:
receiving, after each successful PPDU transmission, a corresponding acknowledgment from another wireless station.

20. The wireless communication method of claim 17, further comprising:
receiving, after each PPDU transmission, wireless link condition information; and
determining, based upon the wireless link condition information, which PPDU to control the transceiver to transmit next.

21. The wireless communication method of claim 17, wherein the transmission rate adaption convergence to the one transmission rate having the highest throughput occurs following a single request-to-send/clear-to-send (RTS/CTS).

22. The wireless communication method of claim 17, wherein at least one of the PPDUs is free of arbitration inter-frame spacing (AIFS) and a backoff period.

23. The wireless communication method of claim 17, wherein the transmission rate adaption sequence comprises dynamically changing modulation and coding scheme (MCS), number of spatial streams (Nss), bandwidth, guard interval (GI), and transmission power until the transmission rate adaptation and transmission power convergence.

* * * * *